Sept. 18, 1962 R. SCHWING 3,054,620
GASKET RING
Filed Sept. 9, 1960
Fig. 1.
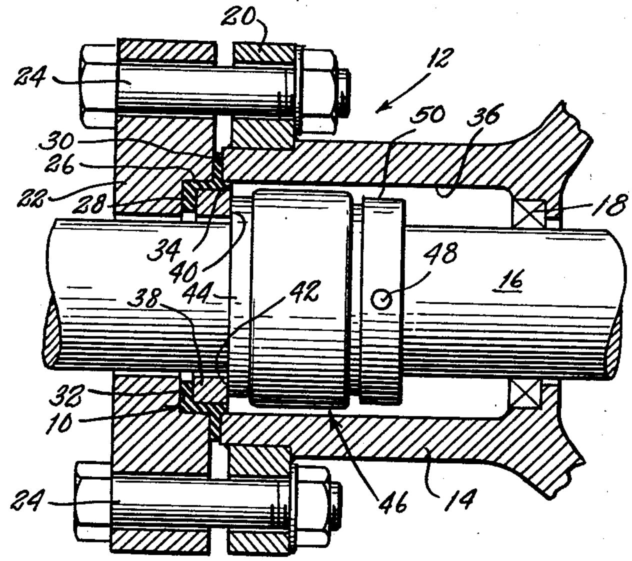
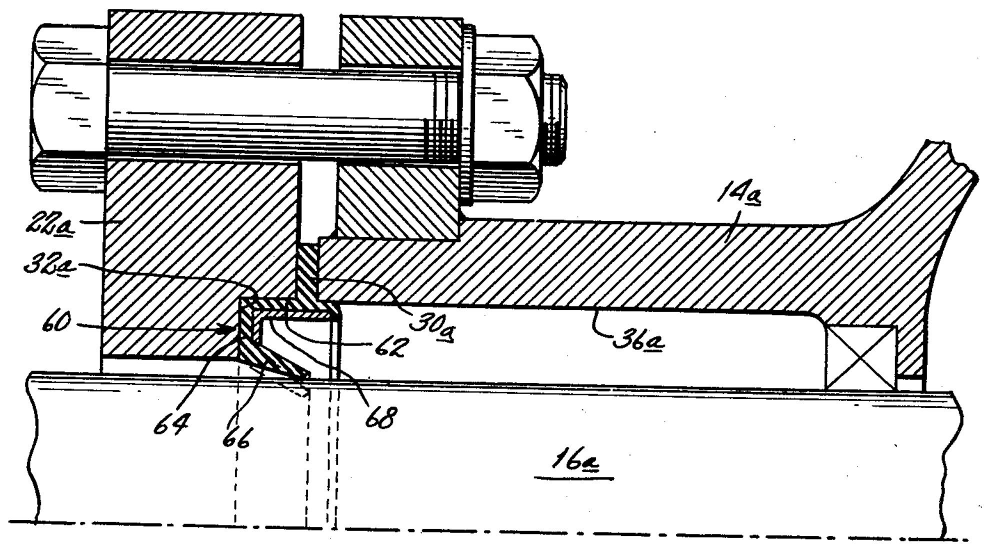
Fig. 2.
INVENTOR:
ROGER SCHWING
BY Robert Henderson
ATTORNEY United States Patent Office 3,054,620

Patented Sept. 18, 1962

3,054,620

GASKET RING

Roger Schwing, Palmyra, N.Y., assignor to Garlock Inc., Palmyra, N.Y., a corporation of New York Filed Sept. 9, 1960, Ser. No. 54,968
9 Claims. (Cl. 277—225)

This invention relates to a unitary gasket ring of relatively soft, rubber-like material, and of such shape in cross section that it serves purposes additional to those ordinarily served by gaskets.

An important object of this invention is the provision of a unitary gasket ring of soft, rubber-like material, which serves as a means for yieldably or vibrationally holding, in concentric position, a rigid ring constituting a part of means for effecting a seal between two relatively rotatable machine elements.

Another important object is the provision of such a unitary gasket ring which effectively shields a clamping ring, for the gasket ring, against contact with a sealed fluid which, in the absence of such a shielding gasket ring, would corrode or otherwise detrimentally affect said clamping ring; thereby enabling the latter to be made of a fairly wide choice of relatively inexpensive, non-corrosive-resistant metals.

Another important object is the provision of such a unitary gasket ring formed with an end portion which serves as pilot means for precisely centering a gland or clamping member of one of said machine elements with respect to the remainder of said one machine element, thereby avoiding certain hitherto required machining which was performed upon the gland or clamping member for such centering purposes.

The foregoing and other more or less obvious objects are accomplished by this invention of which two of numerous possible embodiments are disclosed herein, for illustrative purposes, without limiting this invention to those embodiments.

In the accompanying drawing:

FIGURE 1 is a central, axial, sectional view of a preferred embodiment of this invention in association with two relatively rotatably machine elements and related sealing means which are adapted for sealing or confining fluid under relatively high pressure and, for the most part, appear only in elevation.

FIG. 2 is a somewhat similar, but fragmentary, central, axial, sectional view of a preferred embodiment of this invention wherein the related sealing means are suitable only for sealing or confining fluid under relatively low pressure.

Referring to FIG. 1, a gasket ring 10, according to this invention, is fixedly associated with an outer machine element 12 of which a housing sleeve 14 has a shaft 16 extending therethrough, borne for rotation in suitable bearings of which one is shown at 18. The sleeve 14 has a clamping ring 20 welded or otherwise suitably fixed upon its outer end, and a separable gland or clamping ring 22 may be drawn toward the ring 20 by bolts 24 to clamp a portion of the gasket ring 10 between the ring 22 and the adjacent end of the sleeve 14.

The gasket ring 10 is of relatively soft rubber or rubber-like material and is molded to the shape indicated in the drawing to provide, as its parts, a cylindrical web 26, an integral, inner radial web 28 extending radially inwardly from the outer end of web 26, and an integral, outer radial web 30 extending radially outwardly from a location adjacent to the inner end of web 26.

The radial web 28 and the outer end portion of the cylindrical web 26 seat, with a tight fit, within an internal, circular rabbet 32 formed in the gland ring 22. The radial web 30 is clamped tightly between the gland ring 22 and the end of the housing sleeve 14, and a free, inner end portion 34 of the cylindrical web 26 extends, with a tight fit, into the bore 36 of sleeve 14. A rigid, stationary sealing ring or seal seat 38 is retained with a tight fit within the inside angle formed by the webs 26 and 28, and its annular end surface 40 is in sliding sealing engagement with an opposed, annular end surface 42 of a rigid, rotary sealing ring 44 which is a part of a rotary seal 46 fixed, by set-screw 48, upon the shaft 16 to turn with the latter. The rotary seal 46 includes means (not shown) for sealing itself to the shaft 16 and for yieldably urging the rotary ring 44 toward ring 38 and maintaining the two said rigid rings in sliding sealing engagement. The details of the rotary seal 46 are not further disclosed or described herein as the rotary seal per se is not the present invention. Various specific types of rotary seals, obviously, could be employed in conjunction with this invention.

As practical matters, in molding the gasket ring 10, the outside diameter of web 26 may be made slightly greater than the diameter of bore 36 and than the radial diameter of the rabbet 32, and the inside diameter of the web 26 may be made slightly less than the outside diameter of the ring 38, these proportions insuring a tight fit of the ring 38 within the web 26 when the mentioned parts are assembled. Of course, the ring 38 may be cemeted in place within the gasket ring 10 if desired.

Several hereinafter described attributes of this invention should be noted.

Because of the fact that the rigid, stationary ring 38 is carried within the gasket ring 10 of flexible rubber-like material, it may shift or vibrate slightly within the gasket ring in unison with any shifting or vibration of rotary ring 44 which may occur, thereby maintaining an unimpaired, sealing relationship between the rings 38 and 44.

By reason of the integral relationship between the several webs constituting the gasket ring 10, the latter functions as a highly effective, unbroken sealing shield between possibly corrosive sealed fluid in the annular space 50 and the gland ring 22 so that the latter may be made of relatively inexpensive metal rather than of special, ordinarily expensive metal.

The provision of the free, inner end portion 34, as a part of the gasket ring 10, to fit within the bore 36 enables the gasket ring to function effectively as means for achieving the highly important precise centering of the gland ring 22 and, hence, of the stationary, rigid sealing ring 38 before the bolts 24 are tightened in assembling the disclosed structure. In the absence of the end portion 34, the gland ring 22 and/or the end of the sleeve 14 adjacent to the gland ring would have to be additionally machined so that they would fit together, one within the other, to provide and maintain the desired concentricity of the gland ring 22 and the rigid, stationary sealing ring 38.

The fact that web 30 is integral with web 26, rather than provided as a separate gasket, enables the web 26 to hold the web 30 in perfect annular form and thus render the latter web more efficient, for gasketing purposes between the opposing faces of the clamping ring 22 and the end of sleeve 14, than if such a separate gasket were provided. A separate gasket often tends to flow outwardly non-uniformly when compressed as by tightening of bolts 24, thereby engendering a non-uniform and inefficient sealing effect.

Also, the fact that the web 30 is integral with web 26. enables the gasket ring to be molded as a single unit rather than as separate parts which would involve higher production costs.

The second embodiment, illustrated in FIG. 2, differs from the first-described embodiment chiefly in that parts of the gasket ring serve additionally as integral parts of a flexible shaft sealing member which is suitable for sealing against escape along the shaft of fluid which is under relatively low pressure. Thus, in an annular, flexible shaft sealing element 60 of rubber-like material, a cylindrical web 62, corresponding to some extent to web 26 in FIG. 1, has an integral, radially outwardly extending web 30*a* (corresponding to web 30 of FIG. 1) which is clamped between gland ring 22*a* and the adjacent end of housing sleeve 14*a*, and an integral radially inwardly extending web 64, corresponding to some extent to web 28 in FIG. 1.

The webs 62 and 64 also constitute, respectively a mounting portion and a radial web of the shaft sealing element, and the latter further includes a frusto-conical sealing flange 66 which is integral with web 64 and so molded, as indicated in broken lines, that its free circular edge is of slightly smaller radial diameter than the diameter of the shaft 16*a*; and, when applied upon the latter, expands somewhat and engages the shaft under tension and forms a sliding seal therewith.

A rigid ring 68, of angular shape in cross section, is disposed within and against the webs 62 and 64 to aid in compressing said webs tightly against inner surfaces of rabbet 32*a* in ring 22*a* and of the bore 36*a* of sleeve 14*a*.

It should be noted that a portion of ring 68 underlies an end portion of web 62 and cooperates with the latter in establishing and preserving the concentricity of the gland ring 22*a* and of the sealing element 60. It should also be observed that except for the fact that ring 68 need not be capable of shifting or vibrating, the present invention, according to the second disclosed-embodiment, possesses all the attributes hereinbefore set forth with respect to the first-disclosed embodiment. Additionally, an arrangement according to the second embodiment enables a flexible, shaft sealing element to be molded integrally with the gasket ring with obvious savings in production costs.

Those familiar with this art will readily understand that the present inventive concept may be utilized in structural arrangements other than those disclosed and described herein without departing from the invention as set forth in the following claims.

I claim:

1. A unitary gasket ring of relatively soft, rubber-like material, comprising a cylindrical web and integral annular webs one extending radially inwardly and another extending radially outwardly from said cylindrical web; said annular webs being at different axial locations of the cylindrical web, said radially outwardly extending web being perpendicular to the axis of said cylindrical web and adapted to be clamped between separable clamping members of a related machine element, and said gasket ring including a frusto-conical sealing flange, integral with said radially inwardly extending web at the latter's inner margin, and having a circular free edge adapted for sliding sealing engagement upon the surface of a related rotary shaft.

2. A unitary gasket ring, of relatively soft, rubber-like material, for use with a device for sealing between two relatively rotatable machine elements, said gasket ring comprising a cylindrical web adapted for substantially static sealing disposition between opposed cylindrical surfaces of one of said elements and of a rigid sealing ring constituting a separable part of said one of said elements, to hold the latter ring in concentric relation to the two said machine elements and to effect a seal between said opposed cylindrical surfaces, a first integral annular web extending radially from said cylindrical web and adapted to effect a substantially static seal between opposed annular surfaces of said one of said elements and said rigid sealing ring, and a second integral annular web extending in a radial direction oppositely from the direction of extension of said first annular web, and adapted to be clamped between opposed annular surfaces of separable parts of said one of said elements.

3. A unitary gasket ring according to claim 2, said first annular web extending radially inwardly and said second annular web extending radially outwardly.

4. A unitary gasket ring according to claim 3, further including a sealing lip integral with said first annular web at the latter's inner periphery and adapted for sliding sealing engagement upon the surface of a related rotary shaft.

5. In combination with outer and inner relatively rotatable machine elements, and sealing means including a relatively rigid ring, for effecting a seal between said elements, a unitary gasket ring, of relatively soft, flexible, rubber-like material, comprising a cylindrical web disposed between and in substantially static sealing engagement with opposed cylindrical surfaces of the outer of said elements and of said rigid ring, a first integral annular web extending radially inwardly from one end of said cylindrical web between and in substantially static engagement with both said rigid ring and a radially extending surface of said outer machine element, and a second integral annular web extending radially outwardly from a location on said cylindrical web toward the other end of the latter, between relatively shiftable clamping members of said outer machine element which are adapted to clamp the latter radially extending web therebetween; said cylindrical web and said first radially extending web constituting means for supporting said rigid ring yieldably against axial thrust and for holding said rigid ring yieldably in concentric relation to said outer machine element.

6. The combination according to claim 5, said radially outwardly extending web being spaced from said other end of the cylindrical web, and defining annular rabbets at opposite sides of said radially outwardly extending web and at the exterior of said cylindrical web for receiving and coaxially aligning said clamping members, and said rigid ring being in radial alignment with both said rabbets in position to hold said cylindrical web firmly against inwardly facing cylindrical surfaces of the outer one of said elements.

7. In combination with outer and inner relatively rotatable machine elements, and sealing means including a relatively rigid ring, for effecting a seal between said elements, a unitary gasket ring, of relatively soft, flexible, rubber-like material, comprising a cylindrical web disposed between and in substantially static sealing engagement with opposed cylindrical surfaces of the outer of said elements and of said rigid ring, a first integral annular web extending radially inwardly from one end of said cylindrical web between and in substantially static engagement with both said rigid ring and a radially extending surface of said outer machine element, and a second integral annular web extending radially outwardly from a location on said cylindrical web toward the other end of the latter, between relatively shiftable clamping members of said outer machine element which are adapted to clamp the latter radially extending web therebetween; said cylindrical web and said first radially extending web constituting means for supporting said rigid ring yieldably against axial thrust and for holding said rigid ring yieldably in concentric relation to said outer machine element, said relatively rigid ring of the sealing means being a stationary seal seat ring having a side face adapted for sliding sealing engagement with a face of a relatively rigid rotary sealing ring constrained to turn with a related shaft, and said seal seat being capable of vibration within said gasket ring.

8. In combination with outer and inner relatively rotating machine elements, and sealing means including a relatively rigid ring, for effecting a seal between said elements, a unitary gasket ring, of relatively soft, flexible, rubber-like material, comprising a cylindrical web disposed between and in substantially static sealing engagement with opposed cylindrical surfaces of the outer of said elements and of said rigid ring, a first integral annular web extending radially inwardly from one end of said cylindrical web between and in substantially static engagement with both said rigid ring and a radially extending surface of said outer machine element, and a second integral annular web extending radially outwardly from a location on said cylindrical web toward the other end of the latter, between relatively shiftable clamping members of said outer machine element which are adapted to clamp the latter radially extending web therebetween; said cylindrical web and said first radially extending web constituting means for supporting said rigid ring yieldably against axial thrust and for holding said rigid ring yieldably in concentric relation to said outer machine element, further including a sealing lip integral with said first annular web at the latter's inner margin and adapted for sliding sealing engagement with a related rotary shaft.

9. In combination with outer and inner relatively rotatable machine elements, and sealing means including a relatively rigid ring, for effecting a seal between said elements, a unitary gasket ring, of relatively soft, flexible, rubber-like material, comprising a cylindrical web disposed between and in substantially static sealing engagement with opposed cylindrical surfaces of the outer of said elements and of said rigid ring, a first integral annular web extending radially inwardly from one end of said cylindrical web between and in substantially static engagement with both said rigid ring and a radially extending surface of said outer machine element, and a second integral annular web extending radially outwardly from a location on said cylindrical web toward the other end of the latter, between relatively shiftable clamping members of said outer machine element which are adapted to clamp the latter radially extending web therebetween; said cylindrical web and said first radially extending web constituting means for supporting said rigid ring yieldably against axial thrust and for holding said rigid ring yieldably in concentric relation to said outer machine element, said relatively rigid ring of the sealing means being a supporting ring in supporting engagement with said gasket ring at an inner cylindrical surface of said cylindrical web and an adjacent annular surface of said first annular web to support the two latter webs in their said static engagement, respectively, with said cylindrical and radially extending surfaces of said outer machine element.

References Cited in the file of this patent

UNITED STATES PATENTS

| | | |
|---|---|---|
| 2,263,653 | Smith et al. | Nov. 25, 1941 |
| 2,270,054 | Hogan | Jan. 13, 1942 |
| 2,403,364 | Hertzell et al. | July 2, 1946 |
| 2,516,191 | Englesson | July 25, 1950 |
| 2,727,769 | Kayser | Dec. 20, 1955 |
| 2,868,566 | Kosatka | Jan. 13, 1959 |
| 2,983,529 | Price | May 9, 1961 |
| 2,984,505 | Andresen et al. | May 16, 1961 |